United States Patent [19]

Nakano

[11] Patent Number: 5,237,697
[45] Date of Patent: Aug. 17, 1993

[54] DATA PROCESSING DEVICE PROVIDED WITH A VOLTAGE DETECTOR

[75] Inventor: Koichi Nakano, Zama, Japan

[73] Assignee: Kabushiki Kaisha Toshiba, Kawasaki, Japan

[21] Appl. No.: 746,719

[22] Filed: Aug. 19, 1991

[30] Foreign Application Priority Data

Aug. 23, 1990 [JP] Japan .................. 2-219935

[51] Int. Cl.$^5$ ............................................. G06F 1/26
[52] U.S. Cl. ........................... 395/750; 364/707; 364/DIG. 1; 364/270; 364/270.2; 364/273.5
[58] Field of Search ............... 395/750; 364/707; 323/234

[56] References Cited

U.S. PATENT DOCUMENTS

| 4,317,180 | 2/1982 | Lies | 364/707 |
| 4,479,191 | 10/1984 | Nojima et al. | 364/707 |
| 5,021,679 | 6/1991 | Fairbanks et al. | 307/66 |

Primary Examiner—Debra A. Chun
Attorney, Agent, or Firm—Finnegan, Henderson, Farabow, Garrett & Dunner

[57] ABSTRACT

This invention is a data processing device operated by a power source and includes a clock signal generator section for generating a clock signal whose clock frequency is changed according to a to-be-measured voltage, a counter section for counting the clock signal generated from the clock signal generator section in a preset period of time, a comparator section for comparing the count of the counter section with a reference value, and a voltage detector section for deriving the to-be-measured voltage based on the result of comparison by the comparator section. Variation in the power source voltage of the data processing device can be detected by use of a voltage detection circuit having the above sections and formed in a simple and small-sized construction.

4 Claims, 3 Drawing Sheets

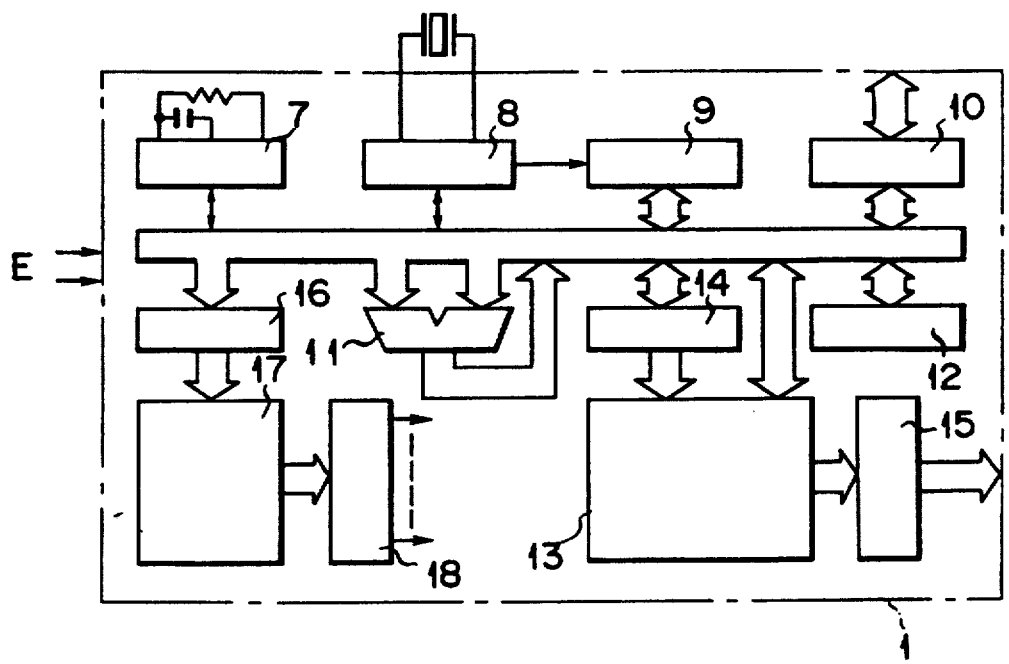
F I G. 2
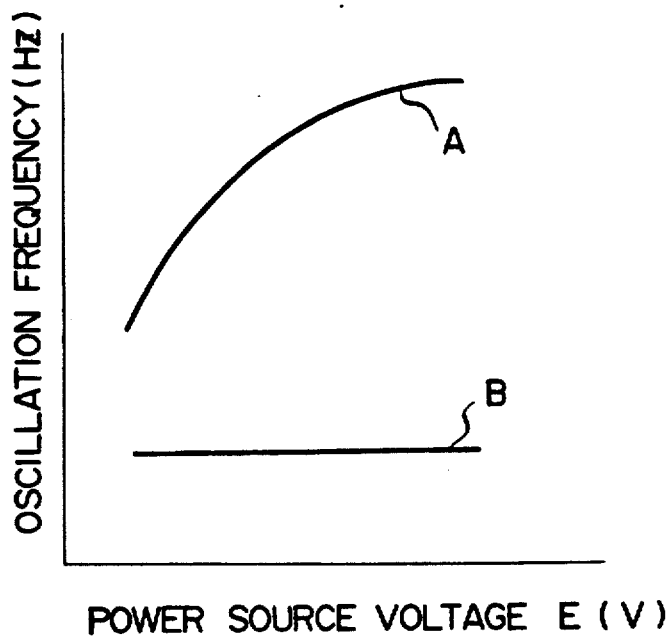
F I G. 3

DATA PROCESSING DEVICE PROVIDED WITH A VOLTAGE DETECTOR

BACKGROUND OF THE INVENTION

1. Field of the Invention

This invention relates to a data processing device having a voltage detection circuit generally used in a battery-operated microcomputer, electronic desk calculator, electronic notebook or the like.

2. Description of the Related Art

FIG. 1 shows the construction of a voltage detection circuit of a conventional microcomputer or the like. The voltage detecting section of the microcomputer 1 constructed by the integrated circuit (IC) of FIG. 1 is externally supplied with a power source voltage E and a reference voltage V1 divided by a resistor 2 and a zener diode 3. Further, the power source voltage E is divided by resistors 4 and 5 and supplied to a voltage comparison circuit 6 as a to-be-detected voltage V2. The voltage comparison circuit 6 compares the reference voltage V1 and to-be-detected voltage V2 with each other and outputs a detection signal F as the result of comparison.

However, the circuit of FIG. 1 has the following defects.

(a) It is necessary to form the circuit elements 2 and 3 for creating the detection voltage V1 used as a comparison reference outside the IC.

(b) It is necessary to provide terminals $T_1$ to $T_3$ used for inputting a reference voltage from the exterior of the IC.

(c) It is necessary to provide the voltage comparison circuit 6 for comparing the reference voltage V1 with the to-be-detected voltage V2.

(d) Only the voltage F is detected.

SUMMARY OF THE INVENTION

An object of this invention is to provide a data processing circuit having a voltage detection circuit solving the above problems by counting the pulses of a clock signal used in a microcomputer or the like.

The above object can be attained by a data processing device operated by a power source, comprising; clock signal generating means for generating a clock signal with a clock frequency changed according to a to-be-measured voltage; counting means for counting the clock signal generated from the clock signal generating means to a preset period of time; comparison means for comparing the count of the counting means with a reference value; and means for deriving the to-be-measured voltage based on the result of comparison obtained by the comparison means.

That is, this invention relates to an improvement in the voltage detection function of the data processing device. For example, a preset period is set by dividing a crystal oscillation frequency. A number of pulse of the clock signal, corresponding to the to-be-measured voltage, in the preset period are counted. The count and a reference value are compared with each other. A to-be-measured voltage corresponding to the comparison result is prepared, thus measuring the voltage. The number of parts to be externally mounted can be reduced by using the thus improved voltage detection circuit and an input terminal for voltage detection can be omitted.

Additional objects and advantages of the invention will be set forth in the description which follows, and in part will be obvious from the description, or may be learned by practice of the invention. The objects and advantages of the invention ma be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a block diagram showing one embodiment of this invention;

FIG. 3 is a characteristic diagram obtained from the embodiment shown in FIG. 2.

DETAILED DESCRIPTION OF THE PREFERRED EMBODIMENTS

Figure 1:
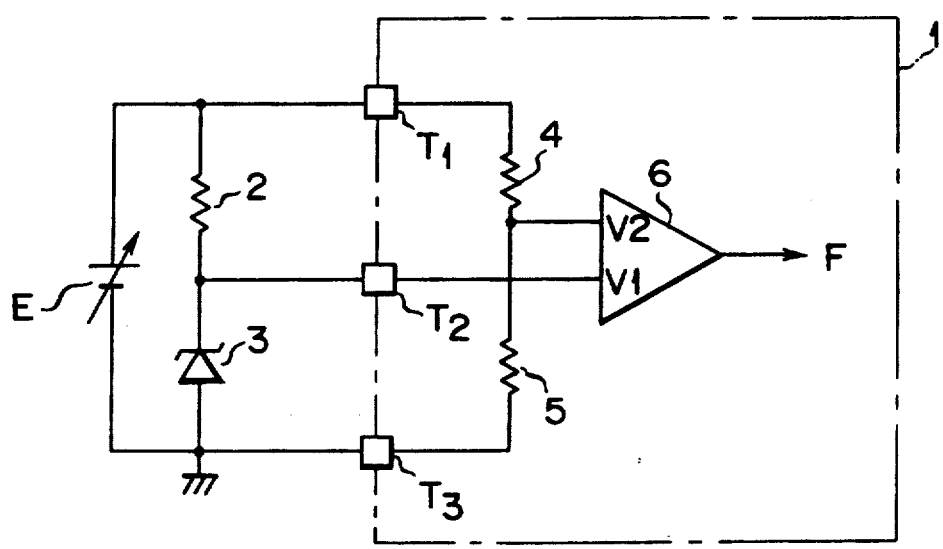
FIG. 1 is a block diagram showing a microcomputer having a conventional voltage detection circuit.

There will now be described an embodiment of the present invention with reference to the accompanying drawings. FIG. 2 is a block diagram showing the construction of a microcomputer formed in an IC configuration according to the present invention. In this construction, a microcomputer 1 is operated when supplied with a power source voltage E from a battery provided outside the IC. The microcomputer 1 includes two oscillators, that is, a clock generator 7 based on CR oscillation and a crystal oscillator 8, a timer (counter) 9 for receiving a crystal oscillation output from the crystal oscillator 8, an input/output port 10 for permitting data to be input and output, an operation circuit (which is an arithmetic logic unit ALU) 11 for effecting various operations, an accumulator 12 for storing the results of various operations, a data random access memory (RAM) 13 for storing numerals, a register 14 for designating the address of the data RAM 13, and a display circuit 15 for displaying the contents of the data RAM 13 and an instruction of a program read only memory (ROM) 17 specified by a program counter 16 and decoded by an instruction decoder 18 and executed.

The oscillation frequencies of the two oscillators 7 and 8, which are operated by the power source voltage E, respectively have the characteristics shown in FIG. 3. As is clearly seen from FIG. 3, the CR oscillation frequency characteristic A varies according to the power source voltage E but the crystal oscillation characteristic B is kept constant irrespective of the power source voltage E. The present invention utilizes these characteristics.

The microcomputer 1 executes an instruction by using a clock of the system clock generator 7 as a reference signal, and therefore, the instruction executing speed varies according to variation in the power source voltage E. That is, since the number of instructions to be executed in a constant (preset) period of time varies, the present value of the power source voltage E can be detected by counting the instructions in a constant (preset) period of time and comparing the counted value with a reference count.

Figure 4:
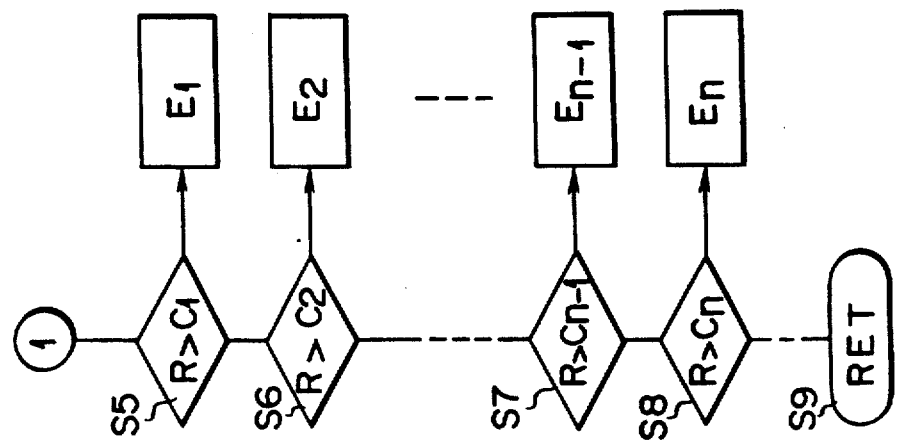
FIG. 4 is a flowchart showing the operation of the above construction.
Figure 4:
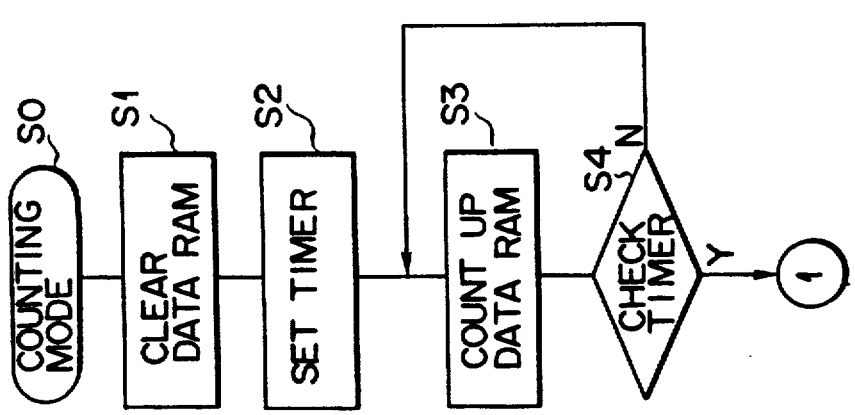

The counting operation and the count comparing operation are explained with reference to FIG. 4. First, the counting mode is set in the step S0 and then initialization is effected by clearing the data RAM 13 (step S1) and setting the counter 9 (step S2). Next, the numerical value of the data RAM 13 is counted (step S3) and the counter 9 is checked (step S4). The steps S3 and S4 are repeatedly effected until the preset time of the counter 9 has elapsed. Then the operation circuit 11 effects the increment of "1" to count the numerical value R of the data RAM 13 for each time the steps S3 and S4 are repeatedly effected. When the preset time of the counter 9 has elapsed (which can be detected by counting the output of the crystal oscillator 8 by means of the counter 9), the step S5 is effected. The numerical value of the data RAM 13 which has been counted corresponds to the present value of the power source voltage E (at this time, assume that the power source voltage to be compared with the voltage E is $E_n$, where $n = 1, 2, \ldots, n$) and the power source voltage $E_n$ can be derived by comparing it with the count $C_n$ corresponding to the power source voltage $E_n$. The count value R stored in the RAM 13 corresponds to the number of times which the steps S3 and S4 are repeatedly effected. The count $C_n$ ($n = 1, 2, \ldots, n$) is a reference value and is stored in the program ROM 17, for example. $E_1$ to $E_n$ are voltage values corresponding to $C_1$ to $C_n$ and may be stored in a proper memory to be read out when required. The comparing operations in the steps S5 to S8 can be effected by use of the operation circuit 11, for example. It is advantageous if the operation circuit 11 is used since it is not necessary to additionally provide comparing means for this use. The comparison operation of the comparator circuit 11 can be effected by performing a subtraction between the two inputs and checking whether the sign of the subtraction result is "+", "−" or "=", for example. The "RET" in step S9 is a return instruction and indicates that the counting program for the power source voltage E is terminated.

According to the above embodiment, the following advantages can be obtained.

Since the number of externally attached parts (such as the resistor 2 and zener diode 3 in FIG. 1, for example) is reduced, the cost of a product having the microcomputer 1 built therein can be lowered. Further, the product can be made compact and the process for assembling the product can be simplified.

Since an input terminal, such as $T_2$, for the reference voltage is not necessary, the number of lead-out terminals can be reduced and the size thereof can be reduced.

Since the voltage comparison circuit 6 is not necessary, the number of elements of the integrated circuit can be reduced, the chip size can be reduced and high reliability can be attained.

In FIG. 1, only a single voltage output is detected, but in this invention, a plurality of voltage values $E_1$ to $E_n$ can be easily detected.

As described above, according to this invention, a data processing device can be provided which has advantages that it is possible to reduce the number of externally attached parts and the number of lead-out terminals used when it is formed in an IC form. Further, since the conventional voltage comparing circuit can be omitted, the product can be made compact, the size of the semiconductor chip can be reduced, the cost thereof can be lowered and a plurality of to-be-measured voltages can be obtained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data processing device operated by a power source voltage and provided with a voltage detector for detecting a value of the power source voltage, comprising:

clock signal generating means, for generating clock signals at a speed which varies according to the value of the power source voltage;

program storing means, coupled to the clock signal generating means, for executing instructions of a program at a speed corresponding to the generating speed of the clock signal generating means;

first counting means, coupled to the clock signal generating means, for counting the clock signals generated by said clock signal generating means for a preset period of time and for obtaining a count value;

means for storing a plurality of reference values corresponding to a plurality of power source voltages;

comparison means, coupled to the storing means, for comparing the count value obtained by said counting means with a reference value selected from the plurality of reference values and for obtaining a comparison result; and deriving means, coupled to the comparison means, for deriving the value of the power source voltage as having a value of one of the plurality of reference values which is closest in value to the count value, based on the comparison result obtained by said comparison means.

2. The data processing device according to claim 1, wherein said power supply voltage is supplied from a battery.

3. The data processing device according to claim 1, further comprising second counting means and a crystal oscillator, coupled to the clock signal generating means, wherein said preset period of time is defined by counting an output signal from the crystal oscillator by the second counting means.

4. The data processing device according to claim 1, wherein said comparison means is an arithmetic logical unit (ALU), which compares the count value obtained by the counting means with the selected reference value.

* * * * *